United States Patent
Hashimoto et al.

(10) Patent No.: US 6,923,665 B2
(45) Date of Patent: Aug. 2, 2005

(54) CARD CONNECTOR (75) Inventors: Shinichi Hashimoto, Kanagawa (JP);
Shinsaku Toda, Kanagawa (JP)

(73) Assignee: TYCO Electronics AMP K.K., Kanagawa-ken (JP)

( * ) Notice: Subject to any disclaimer, the term of this patent is extended or adjusted under 35 U.S.C. 154(b) by 0 days.

(21) Appl. No.: 10/863,190

(22) Filed: Jun. 8, 2004

(65) Prior Publication Data
US 2004/0259398 A1 Dec. 23, 2004

(30) Foreign Application Priority Data

Jun. 17, 2003 (JP) ........................................ 2003-172199

(51) Int. Cl.[7] .............................................. H01R 13/62
(52) U.S. Cl. ...................................................... 439/159
(58) Field of Search .................................. 439/159, 160

(56) References Cited

U.S. PATENT DOCUMENTS

| | | | |
|---|---|---|---|
| 6,113,403 A | 9/2000 | Oguchi | |
| 6,162,075 A | 12/2000 | Hara et al. | |
| 6,406,311 B1 | 6/2002 | Yu | |
| 6,527,568 B2 * | 3/2003 | Nakamura | 439/159 |
| 6,527,569 B2 * | 3/2003 | Kodama et al. | 439/159 |
| 6,609,918 B2 * | 8/2003 | Uchikawa | 439/159 |
| 6,619,971 B1 * | 9/2003 | Chen | 439/159 |
| 6,626,689 B1 * | 9/2003 | Yu | 439/159 |
| 6,702,599 B2 * | 3/2004 | Hu et al. | 439/159 |
| 6,729,893 B2 * | 5/2004 | Ezaki | 439/159 |
| 6,736,656 B1 * | 5/2004 | Yu | 439/159 |
| 6,739,890 B2 * | 5/2004 | Hirata et al. | 439/159 |
| 6,776,631 B2 * | 8/2004 | Shimada et al. | 439/159 |
| 2002/0160639 A1 | 10/2002 | Ezaki | |

FOREIGN PATENT DOCUMENTS

| | | |
|---|---|---|
| JP | 11-219756 | 8/1999 |
| JP | 2002-324623 | 11/2002 |

* cited by examiner

*Primary Examiner*—Ross Gushi
(74) *Attorney, Agent, or Firm*—Barley Snyder LLC

(57) ABSTRACT

A card connector comprises a contact housing, a frame attached thereto configured to guide a card during insertion and removal, a pivoting arm pivotally disposed on the housing to eject the card, and an ejection mechanism disposed on the side of the frame configured to pivot the pivoting arm. The ejection mechanism comprises a first bar which has a button on one end and an engaging arm on the other end, a second bar which has a first engaging part on one end that selectively engages the engaging arm when the card is to be ejected and a second engaging part on the other end that engages with the pivoting arm, a cover supporting the first bar and second bar and allowing the bars to move in the forward-rearward direction, and forcing means that force the first bar rearward. The first bar and second bar are aligned with one another along a side wall of the frame. A locking projection on the frame engages the engaging arm preventing rearward retraction of the first bar. The locking projection has a tapered surface flexing the engaging arm outward with respect to the frame when the first bar is locked, permitting passage of the first engaging part of the second bar. A tapered part on the cover flexes the engaging arm upward when the first bar is released. A guide disposed on the second bar has a side edge that is engaged by the engaging arm when the first bar is released.

5 Claims, 13 Drawing Sheets

Prior Art

FIG.14

Prior Art

FIG.15

Prior Art

FIG.16A

Prior Art

FIG.16B

Prior Art

CARD CONNECTOR

FIELD OF THE INVENTION

The present invention relates to a card connector which has an ejection mechanism that provides a "push-push" operation.

BACKGROUND OF THE INVENTION

Card connectors have been developed which have an ejection mechanism with a "push-push" operation. These connectors are devised so that the operating part (ejection button) does not protrude when a card such as a memory card is inserted into the connector or when no card is inserted into the connector. Rather the ejection button only protrudes when a card that has been inserted into the connector is to be ejected from the connector.

Figure 13:
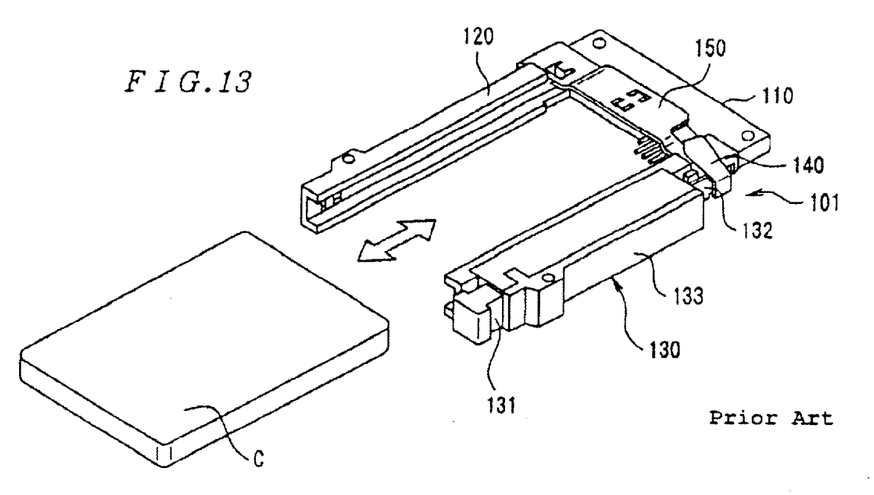
FIG. 13 is a perspective view of a conventional example of a card connector which has a push-push type ejection mechanism.
Figure 14:
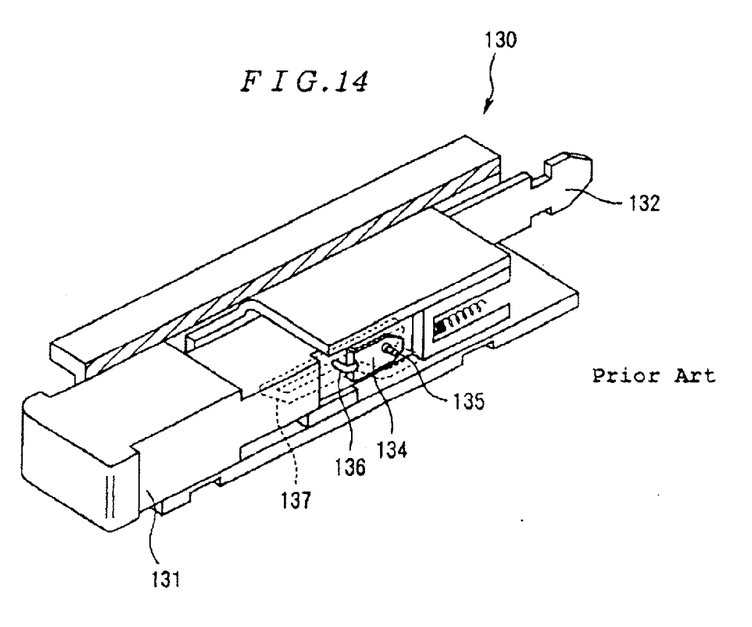
FIG. 14 is a sectional perspective view of the main parts of the ejection mechanism of the card connector shown in FIG. 13.

An exemplary card connector 101, shown in FIGS. 13 and 14, which has a push-push ejection mechanism is described in Japanese Patent Application Laid-Open No. H11-219756. This card connector 101 comprises a contact portion 110, a frame body 120 which guides a card C so that this card can be inserted or removed, a push-push type ejection mechanism 130 which is disposed on the side of the frame body 120 and includes a first push rod 131 and a second push rod 132, a separating lever 140 which pivots as a result of receiving a pressing force from the push rods of the ejection mechanism 130, and a frame 150 which ejects the inserted card C when the separating lever 140 pivots.

Here, the first push rod 131 receives a pressing force from the operator and the second push rod 132 transmits this pressing force to the separating lever 140. The first push rod 131 and second push rod 132 are engaged via an intermediate member 134. The intermediate member 134 is supported on the first rod 131 by a spring 136 so that the intermediate member 134 can pivot between a position in which the member 134 is engaged with the second rod 132 and a position in which this engagement is released. The pivoting of the intermediate member 134 is accomplished by an arrangement in which one end 135 of the spring 136 which is attached to the intermediate member 134 engages with a heart cam groove 137 formed in a cover member 133, and the heart cam groove 137 is caused to perform a cyclic motion accompanying the reciprocating motion of the first rod 131.

However, in the card connector 101 shown in FIGS. 13 and 14, the card connector 101 as a whole cannot be made compact, because the heart cam structure is employed and the ejection mechanism 130 has a large width.

Figure 15:
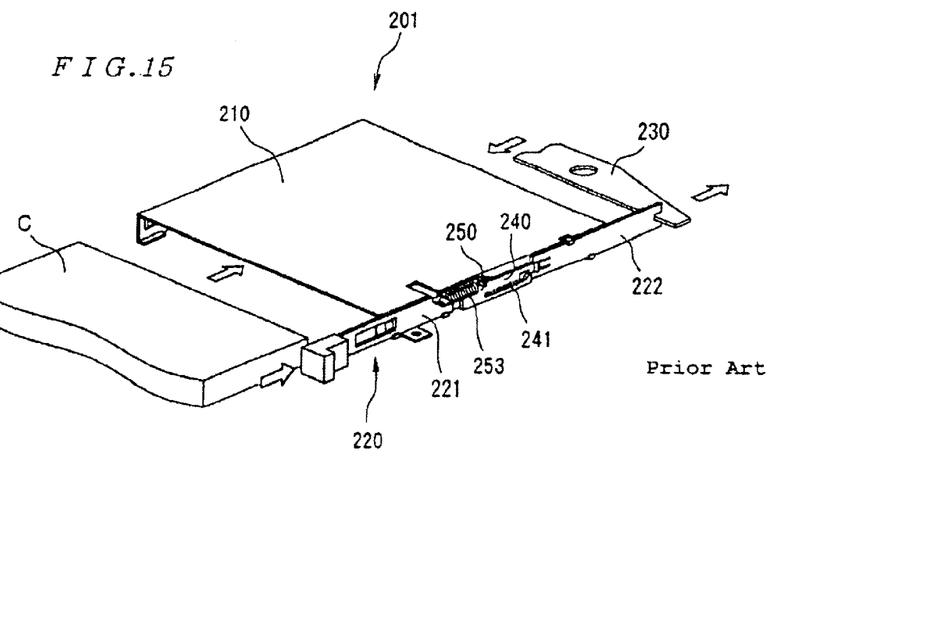
FIG. 15 is a perspective view of another conventional example of a card connector which has a push-push type ejection mechanism.
Figure 16A:
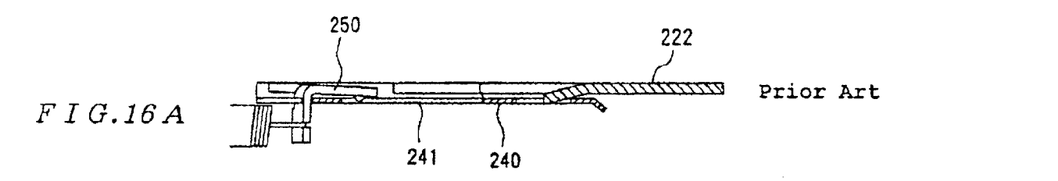
FIGS. 16(A) and 16(B) show the main parts of the ejection mechanism of the card connector shown in FIG. 15, with FIG. 16(A) showing a plan view, and FIG. 16(B) showing a side view.
Figure 16B:
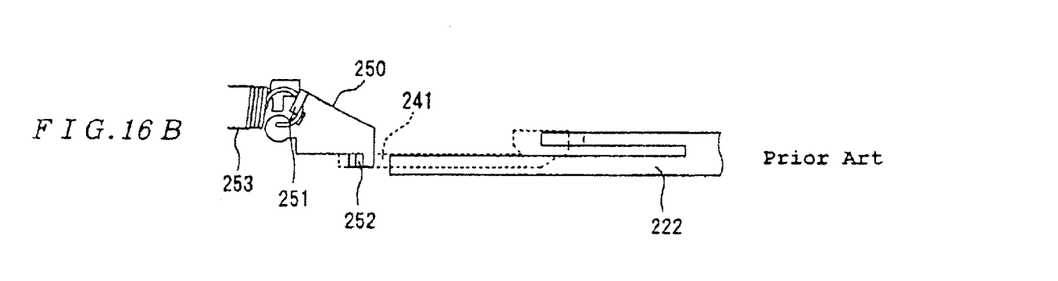

In an attempt to solve this problem, another exemplary push-push card connector 201, shown in FIGS. 15, 16(A) and 16(B), has been proposed, as described in Japanese Patent Application Laid-Open No. 2002-324623.

This card connector 201 comprises a frame 210 which guides a card C so that this card can be inserted or removed, a push-push type ejection mechanism 220 which is disposed on the side of the frame 210 and includes a first push rod 221 and a second push rod 222, and an ejection lever 230 which pivots as a result of receiving a pressing force from the push rods of the ejection mechanism 220, and ejects the inserted card C.

Here, the first push rod 221 receives a pressing force from the operator, and the second push rod 222 transmits this pressing force to the ejection lever 230. A cam member 250 which engages with a guide groove 241 formed in a guide plate 240 is disposed on the tip end of the first push rod 221 that faces the second push rod 222, and the first push rod 221 and second push rod 222 are connected via the cam member 250 during the ejection of the card C.

Thus, since the push rods which drive the ejection lever 230 that is used to eject the card C are actuated via a cam member 250, and since the guide plate 240 which has the guide groove 241 with which the cam member 250 engages is formed in the form of a plate, the width dimension of the card connector 201 can be reduced, so that the card connector 201 as a whole can be made compact.

However, a high degree of precision is required in the forming of the cam member 250. Thus, the manufacture of the cam member 250 is difficult. Furthermore, in the attachment of the cam member 250 to the card connector 201, a spring member 253 must be attached to a hook 251 on the cam member 250, and an engaging part 252 on the cam member 250 must be engaged with the guide groove 241 from the inside of the guide plate 240, so that the assembly of the cam member 250 with the card connector 201 is also difficult.

SUMMARY OF THE INVENTION

According to an exemplary embodiment of the present invention, a card connector is provided comprising a contact housing, a frame attached thereto configured to guide a card during insertion and removal, a pivoting arm pivotally disposed on the housing to eject the card, and an ejection mechanism disposed on the side of the frame configured to pivot the pivoting arm. The ejection mechanism comprises a first bar which has a button on one end and an engaging arm on the other end, a second bar which has a first engaging part on one end that selectively engages the engaging arm when the card is to be ejected and a second engaging part on the other end that engages with the pivoting arm, a cover supporting the first bar and second bar and allowing the bars to move in the forward-rearward direction, and forcing means that force the first bar rearward. The first bar and second bar are aligned with one another along a side wall of the frame. A locking projection on the frame engages the engaging arm preventing rearward retraction of the first bar. The locking projection has a tapered surface flexing the engaging arm outward with respect to the frame when the first bar is locked, permitting passage of the first engaging part of the second bar. A tapered part on the cover flexes the engaging arm upward when the first bar is released. A guide disposed on the second bar has a side edge that is engaged by the engaging arm when the first bar is released.

In this card connector, prior to the insertion of the card, the second bar is positioned in a forward position, while the first bar is prevented from retracting rearward by the engaging arm being engaged with the locking projection of the frame. When a card is inserted while this first bar is locked, the pivoting arm is pressed by the insertion of the card so that this pivoting arm pivots. As a result, the second bar is caused to retract rearward via the second engaging part. When the first bar is locked, the engaging arm of the first bar is caused to flex outward with respect to the frame by the tapered surface of the locking projection. Accordingly, the passage of the first engaging part of the second bar between the frame and engaging arm is allowed. Furthermore, when the card is to be ejected, the button or operating part of the first bar is pressed so that this bar is caused to advance forward, thus releasing the locking of the first bar. When the locking of this first bar is to be released, the first bar is caused to flex upward by the tapered part. The engaging arm that has been caused to flex upward by the tapered part engages with the side edge of the guide of the second bar, and when the pressing operation of the first bar is stopped, the first bar is caused to retract rearward by the action of the forcing means that force the first bar rearward. Accordingly, the engaging arm passes by the side of the locking projection while moving along the side edge of the guide, so that the locking is released. In this case, the button or operating part of the first bar protrudes into the card ejection operating position. Then, when this protruding button or operating part of the first bar is pressed so that the first bar is cause to advance forward, the engaging arm of the first bar engages with the first engaging part of the second bar, so that the second bar advances forward. As a result, the pivoting arm is caused to pivot via the second engaging part of the second bar, so that the card is ejected in the ejection direction. The engaging arm of the first bar advances forward until the second bar is positioned in the position of furthest forward advance. However, when the pressing operation is stopped in this state of forward advance, the first bar is caused to retract rearward by the forcing means, and the engaging arm is engaged with the locking projection of the frame, so that rearward retraction is prevented.

BRIEF DESCRIPTION OF THE DRAWINGS

FIGS. 8(A) to 8(E) show the operation of an exemplary ejection mechanism, according to an embodiment of the present invention, with a cover member attached, in which with FIG. 8(A) shows a state prior to the insertion of the card, FIG. 8(B) shows a state following the insertion of the card.

FIGS. 11(A) and 11(B) show the first stage of the release of the locking of a first bar of an exemplary card connector according to an embodiment of the present invention, with FIG. 11(A) showing a plan view, and FIG. 11(B) showing a left-side view;

DETAILED DESCRIPTION OF THE INVENTION

Figures 1A, 1B, 1C:
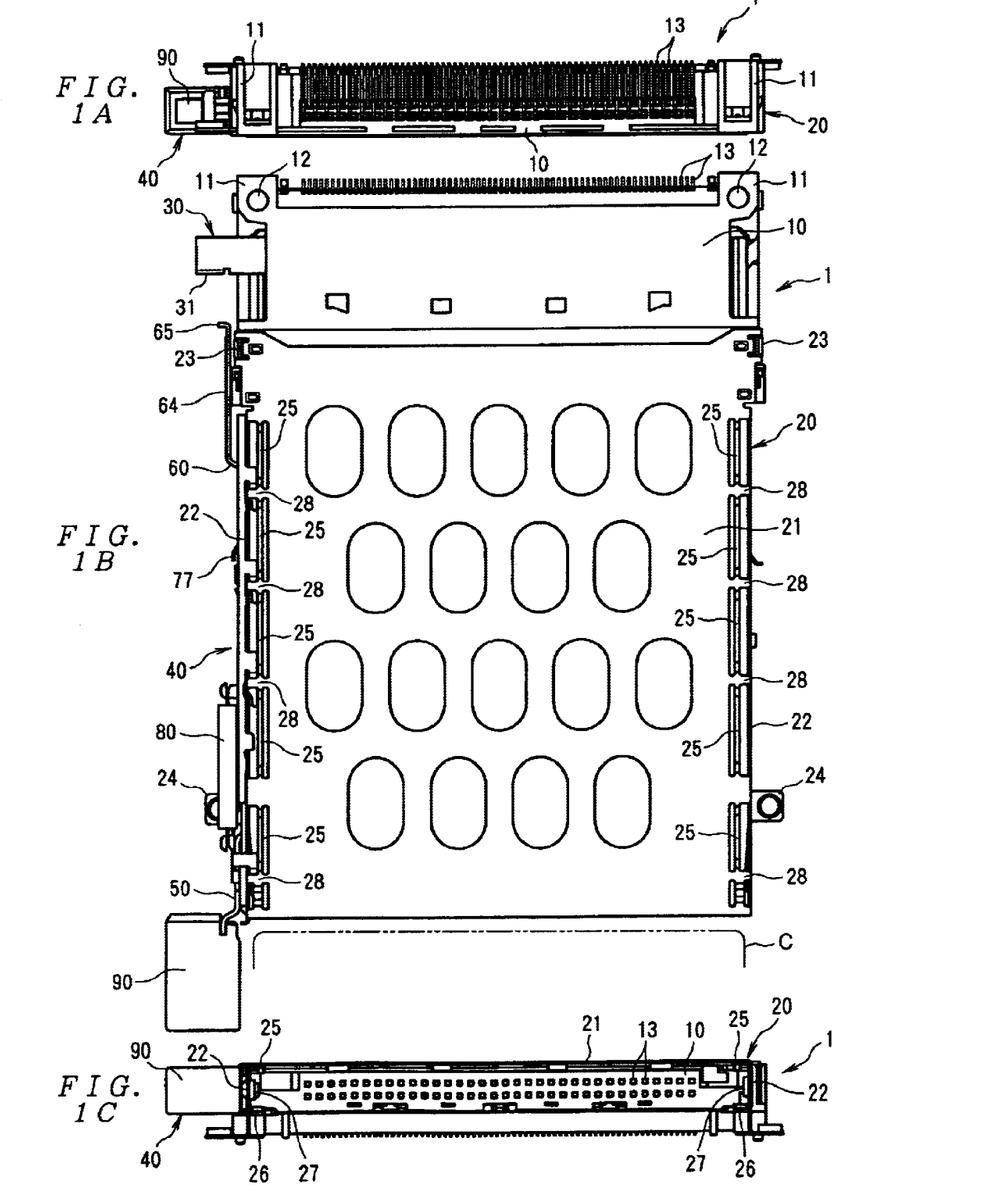
FIGS. 1(A) to 1(C) show an exemplary card connector according to an embodiment of the present invention, with FIG. 1(A) showing a back view, FIG. 1(B) showing a plan view, and FIG. 1(C) showing a front view.
Figure 2A:
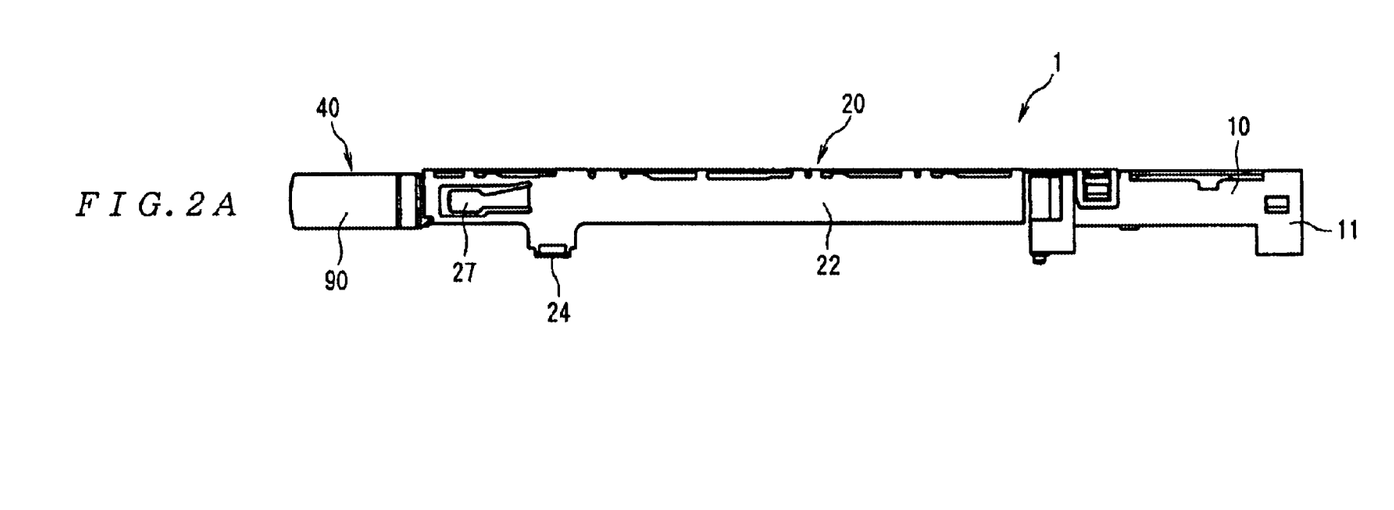
FIGS. 2(A) and 2(B) show the card connector of FIGS. 1(A) to 1(C), with FIG. 2 (A) showing a right-side view and FIG. 2(B) showing a left-side view.
Figure 2B:
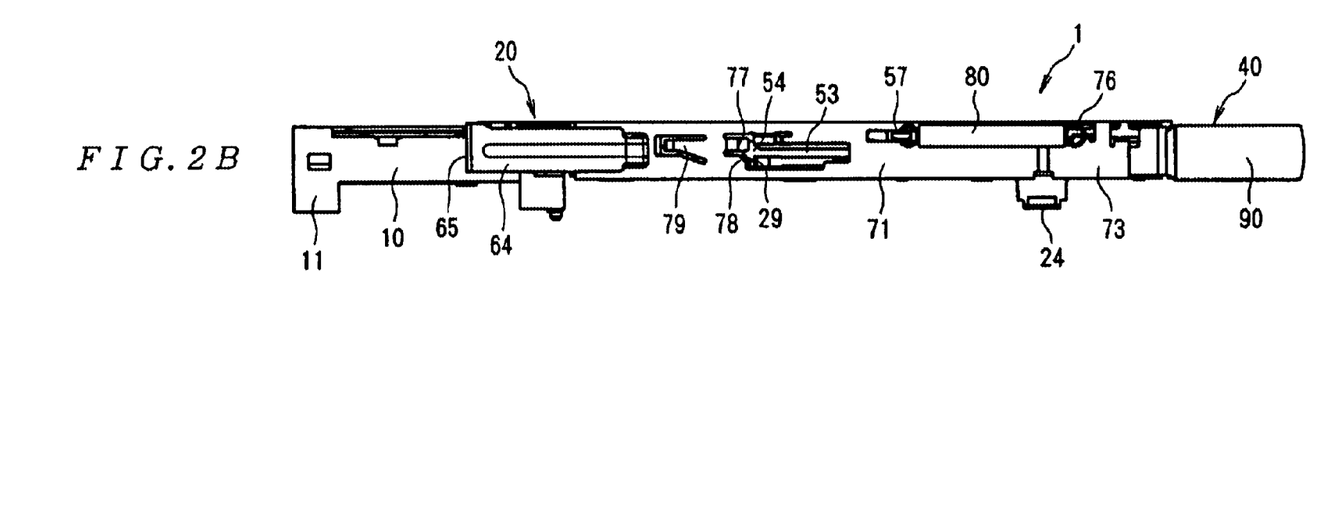

Next, an embodiment of the present invention will be described with reference to the figures. FIGS. 1(A) to 1(C) show an exemplary card connector of the present invention, with FIG. 1(A) showing a back view, FIG. 1(B) showing a plan view, and FIG. 1(C) showing a front view. FIGS. 2(A) and 2(B) show the card connector shown in FIGS. 1(A) to 1(C), with FIG. 2(A) showing a right-side view and FIG. 2(B) showing a left-side view.

In FIGS. 1(A) to 1(C), 2(A) and 2(B), the card connector 1 comprises a housing 10, a frame 20, a pivoting arm 30, and an ejection mechanism 40.

The housing 10 is constructed from a substantially rectangular-solid-form body that extends in the direction of length (i.e., the left-right direction in FIG. 1(B)); this housing 10, may be formed, for example, by molding an insulating resin. Mounting tabs 11 for mounting the card connector on a circuit board (not shown in the figures) are disposed on both ends of the housing 10 in the direction of length, and through-holes 12 used for attachment screws are formed in the respective mounting tabs 11. Furthermore, a plurality of contacts 13 are held in the housing 10 along the direction of length. The respective contacts 13 may be formed, for example, by stamping and forming metal plates. These contacts 13 are connected by soldering to the circuit board, and are engaged with and caused to electrically contact a card C such as a memory card which is inserted into the card connector 1. Furthermore, the pivoting arm 30 is disposed inside the housing 10 so that this pivoting arm 30 can pivot; this pivoting arm comprises a card engaging part (not shown in the figures) that engages with the inserted card C on one end (inside the housing 10), and a bar engaging part 31 that engages with the bent part 65 of the second engaging part 64 of a second bar 60 (described later) on the other end (outside the housing 10). By pivoting, the pivoting arm 30 ejects the inserted card C in the ejection direction (the downward direction in FIG. 1(B)).

Figure 3A:
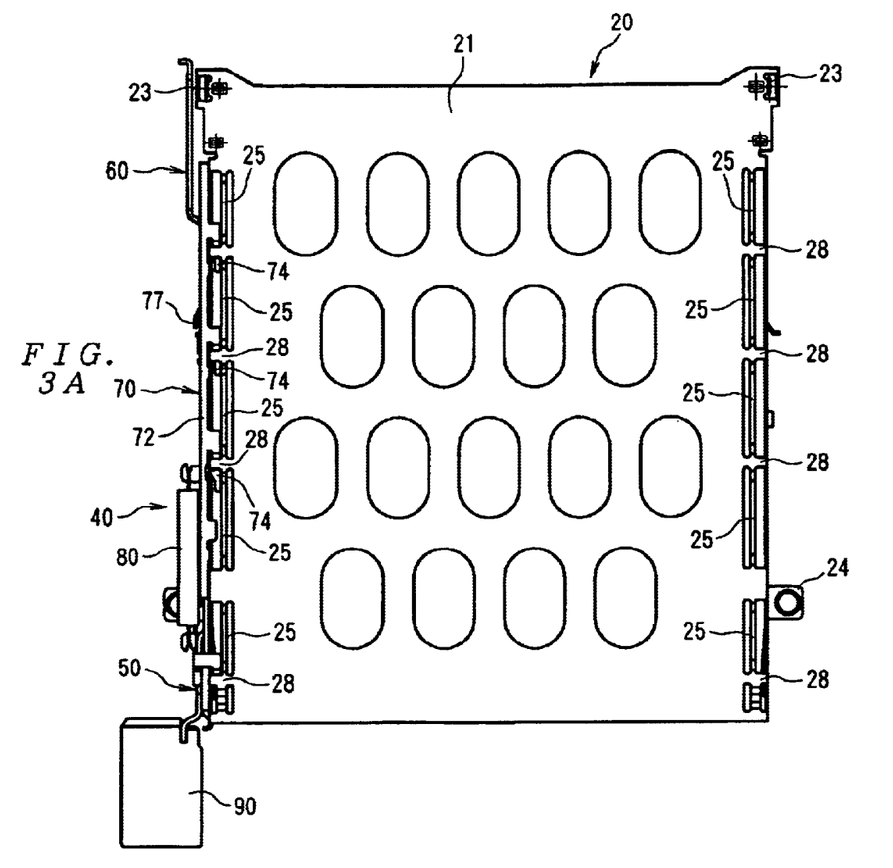
FIGS. 3(A) to 3(C) show the assembled state of a frame and ejection mechanism for an exemplary card connector according to an embodiment of the present invention, with FIG. 3(A) showing a plan view, FIG. 3(B) showing a front view, and FIG. 3(C) showing a left-side view.
Figure 3B:
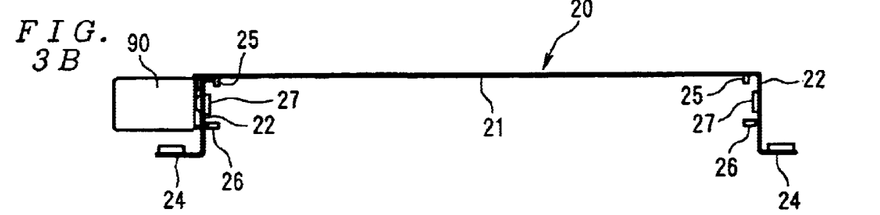
Figure 3C:
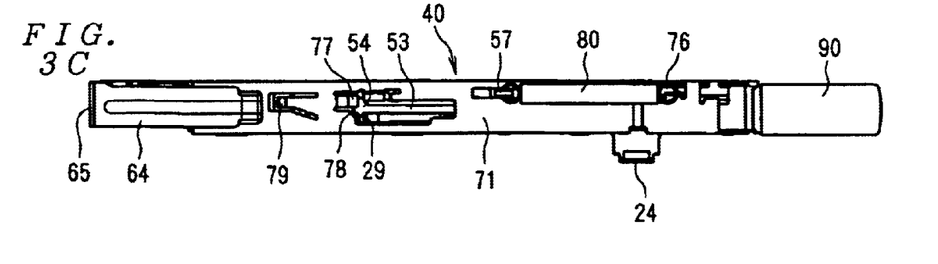
Figure 4A:
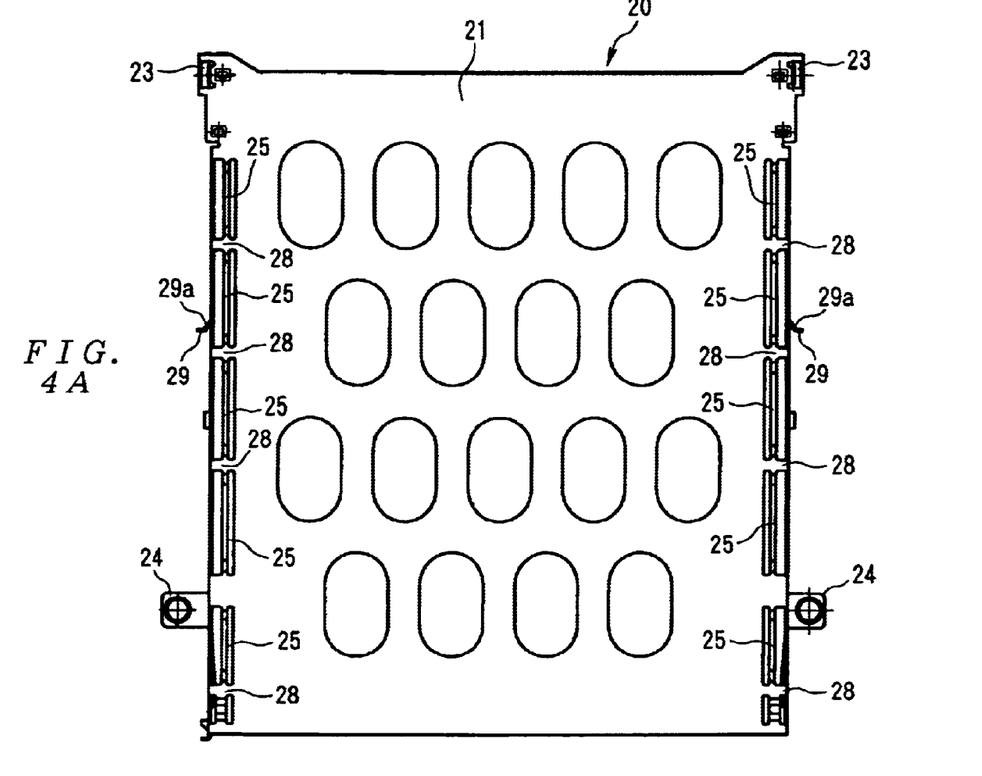
FIGS. 4(A) to 4(C) show a frame for an exemplary card connector according to an embodiment of the present invention, with FIG. 4(A) showing a plan view, FIG. 4(B) showing a front view, and FIG. 4(C) showing a left-side view.
Figure 4B:
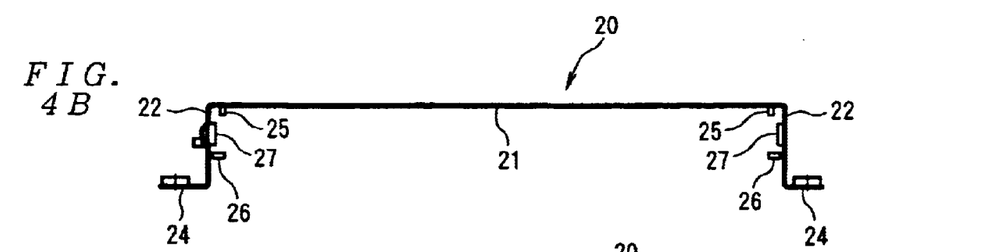
Figure 4C:
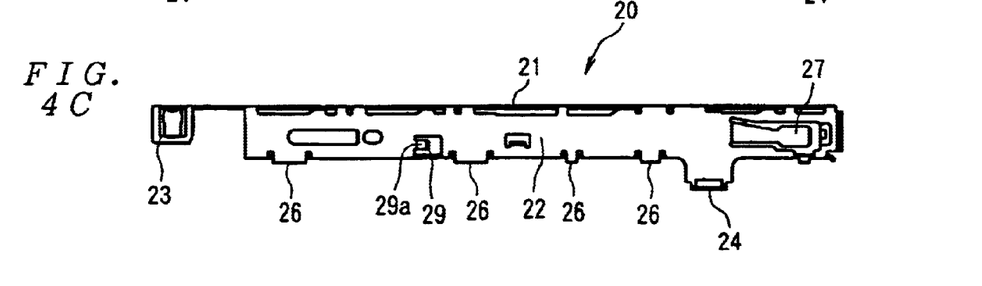

FIGS. 3(A) to 3(C) show the assembled state of the flame 20 and ejection mechanism 40. FIG. 3(A) is a plan view, FIG. 3(B) is a front view, and FIG. 3(C) is a left-side view. FIGS. 4(A) to 4(C) show the frame 20; FIG. 4(A) is a plan view, FIG. 4(B) is a front view, and FIG. 4(C) is a left-side view.

The frame 20 comprises a rectangular flat-plate 21, and a pair of side walls 22 that are bent downward from both ends of the flat-plate 21 in the direction of width (both ends in the left-right direction in FIG. 1(B), hereafter referred to as sides). This frame 20 may be formed, for example, by stamping and forming a metal plate. Fastener tabs 23 are formed by being bent downward on the front portions (upper portions in FIG. 1(B)) of both sides of the flat-plate 21, and are fastened to the housing 10 by press-fitting. Furthermore, mounting parts 24 used for mounting on the circuit board are formed on the rear portions of the respective side walls 22. Moreover, a plurality of guide projections 25 that protrude downward from the flat-plate 21 are formed on both sides of the flat-plate 21, in positions located to the inside of the side walls 22. The respective guide projections 25 are connected to the upper ends of the side walls 22 by connecting parts 28. Furthermore, a plurality of vertical stops 26 are formed by being bent from the lower ends of the respective side walls 22. When a card C is inserted or removed, the movement of the card C in the vertical direction is regulated by the guide projections 25 and vertical stops 26. Furthermore, the movement of the card C in the left-right direction (direction of length of the housing 10) is regulated by the pair of side walls 22, so that the card C is guided in a manner that allows insertion or removal. Furthermore, grounding parts 27 that contact the sides of the inserted card C are formed by being bent inward on the rear portions of the respective side walls 22. Moreover, locking projections 29, which have tapered surfaces 29a, are formed on substantially the central portions of the respective side walls 22 in the forward-rearward direction. The locking projections 29 perform a locking action by engaging with the engaging arm 53 of a first bar 50 (described later) so that rearward retraction of the first bar 50 is prevented.

The ejection mechanism 40 is disposed on the side of the frame 20, and comprises a first bar 50, a second bar 60 and a cover 70. The first bar 50 and second bar 60 are aligned along one side wall 22 of the frame 20 (on the outside of this side wall 22), with the first bar 50 on the rear side and the second bar 60 on the front side. Furthermore, the first bar 50 and second bar 60 are supported by the cover 70, which is attached to the frame 20, such that they can move in the forward-rearward direction.

Figure 5A:
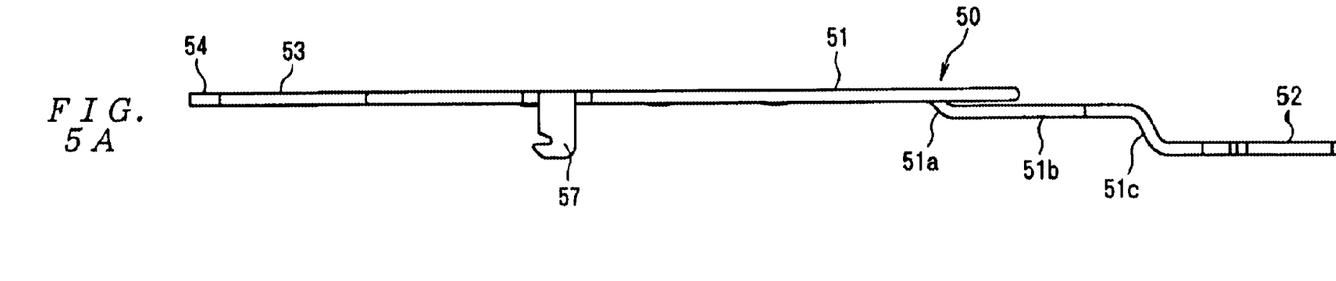
FIGS. 5(A) and 5(B) show a first bar for an exemplary card connector according to an embodiment of the present invention, with FIG. 5(A) showing a plan view and FIG. 5(B) showing a left-side view.
Figure 5B:
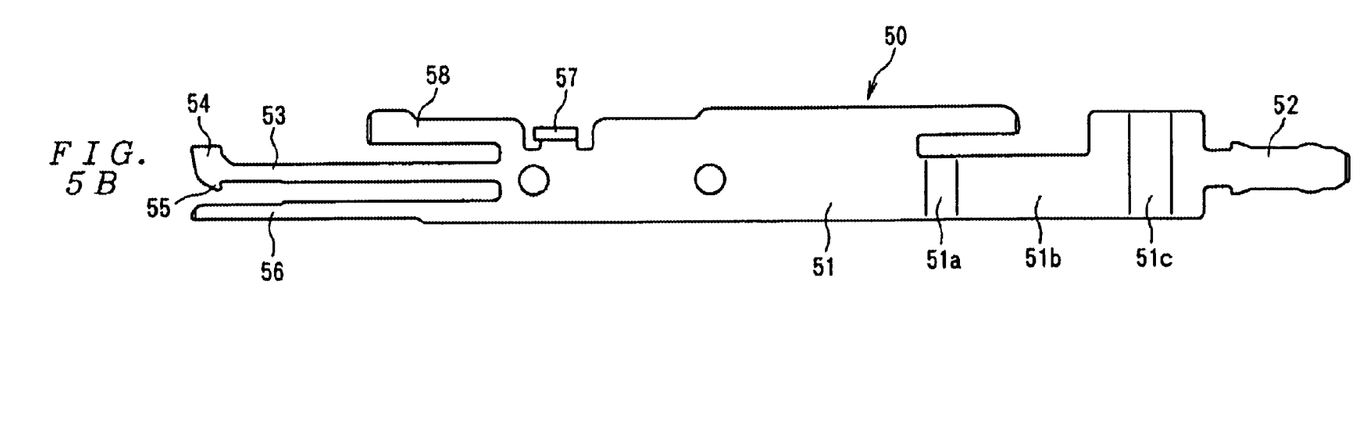
Figure 6A:
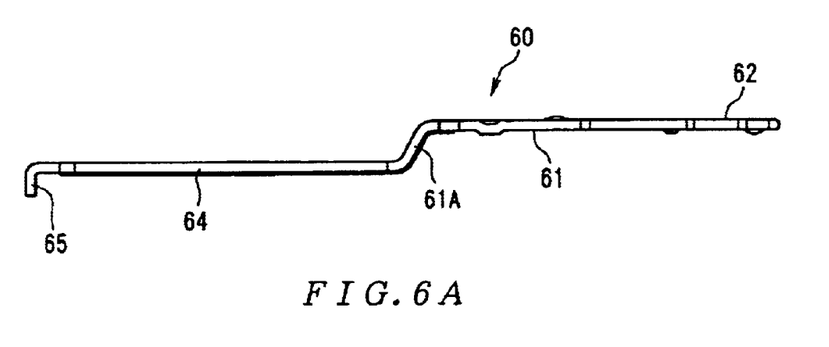
FIGS. 6(A) and 6(B) show a second bar for an exemplary card connector according to an embodiment of the present invention, with FIG. 6(A) showing a plan view and FIG. 6(B) showing a left-side view.
Figure 6B:
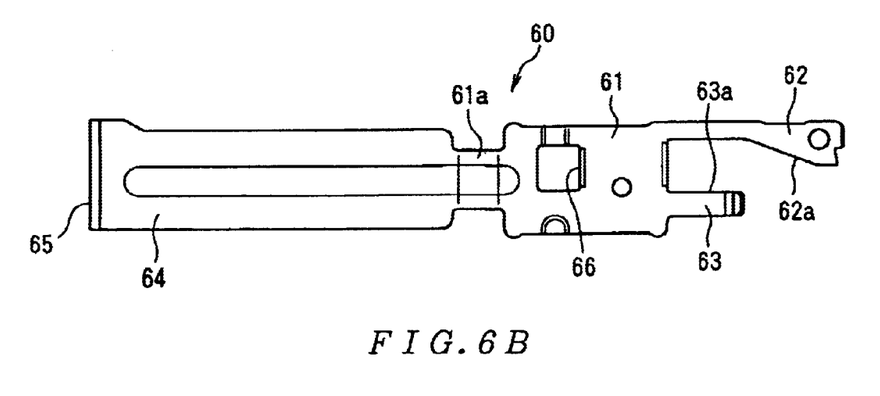
Figure 7A:
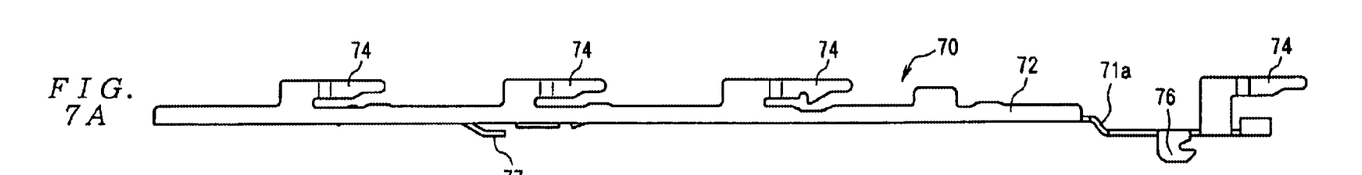
FIGS. 7(A) to 7(D) show a cover member for an exemplary card connector according to an embodiment of the present invention, with FIG. 7(A) showing a plan view, FIG. 7(B) showing a left-side view, FIG. 7(C) showing a bottom view, and FIG. 7(D) showing a front view.
Figure 7B:
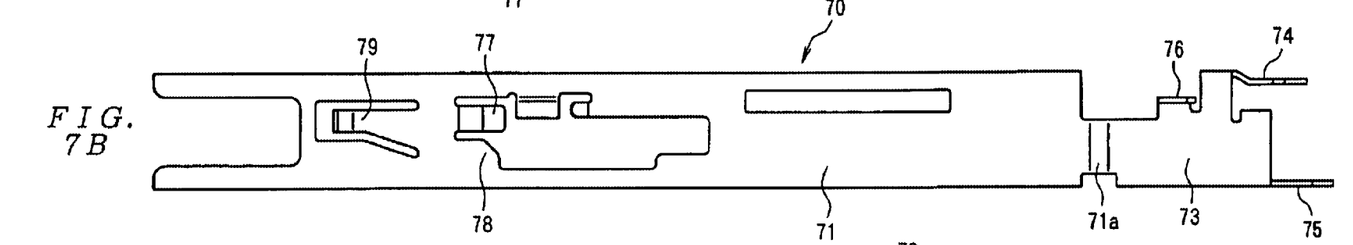
Figure 7C:
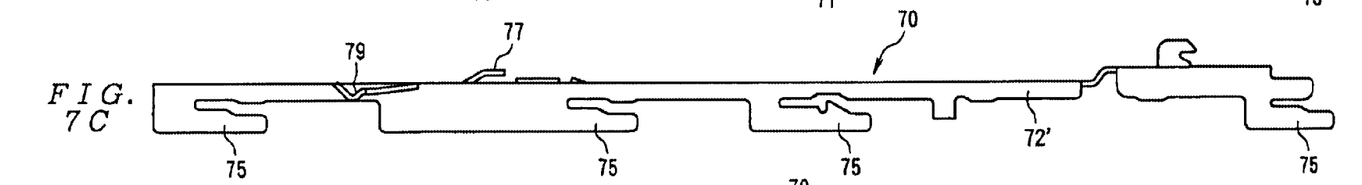
Figure 7D:
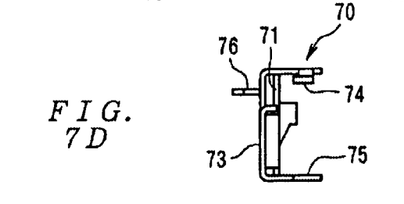

FIGS. 5(A) and 5(B) show the first bar 50; FIG. 5(A) is a plan view, and FIG. 5(B) is a left-side view. FIGS. 6(A) and 6(B) show the second bar 60; FIG. 6(A) is a plan view, and FIG. 6(B) is a left-side view. FIGS. 7(A) to 7(D) show the cover 70; FIG. 7(A) is a plan view, FIG. 7(B) is a left-side view, FIG. 7(C) is a bottom view, and FIG. 7(D) is a front view.

Here, the first bar 50 has a main body 51 which extends in the forward-rearward direction along the side wall 22 of the frame 20. The first bar 50 may be formed, for example, by stamping and forming a metal plate. As is shown in FIGS. 5(A) and 5(B), a button support 52 is formed on the rear end of the main body 51. The button support 52 protrudes rearward via a first inclined part 51a that is inclined outward from the main body 51, a flat-plate part 51b that extends rearward from the first inclined part 51a, and a second inclined part 51c that is inclined outward from the flat-plate part 51b. An eject button (operating part) 90 shown in FIGS. 1(A) to 1(C) and 3(A) to 3(C) is fastened to the button support 52 by press-fitting. An engaging arm 53 is formed on the front end of the main body 51 such that it protrudes forward. An engaging part 54 is disposed on the front end of the engaging arm 53 to engage with the first engaging part 62 of the second bar 60 when the card C is ejected. A locking part 55 is formed so that it protrudes from the lower end of the engaging part 54 to be anchored and locked by the locking projection 29 of the frame 20. When the first bar 50 is to be locked by the locking part 55, the engaging arm 53 is caused to flex outward with respect to the frame 20 by the tapered surface 29a of the locking projection 29, so that the first engaging part 62 of the second bar 60 is allowed to pass. Furthermore, a support 56 protrudes forward from the front end of the main body 51. This support 56 clamps the guide 63 of the second bar 60 together with the lock 55 formed on the engaging arm 53 when the locking of the first bar 50 is to be released. As a result of this clamping, the guide 63(see FIG. 6(B)) of the second bar 60 is pulled in toward the rear and caused to approach the locking projection 29 when the first bar 50 is retracted rearward (see FIGS. 8(D) and 9(D)). Furthermore, an engaging part 57 is formed by being bent outward on the upper front end of the main body 51. The engaging part 57 is engaged by one hook of a tension spring (forcing means) 80 that forces the first bar 50 rearward. An anti-rattling part 58 is disposed side by side with the engaging arm 53. This anti-rattling part 58 prevents inclination of the first bar 50 by engaging with the guide 72 of the cover 70.

The second bar 60 has a main body 61 that extends in the forward-rearward direction along the side wall 22 of the frame 20. This second bar 60 may be formed, for example, by stamping and forming a metal plate. As is shown in FIGS. 6(A) and 6(B), a first engaging part 62 is formed so that this first engaging part 62 protrudes rearward from the rear end of the main body 61. The first engaging part 62 engages with the engaging part 54 formed on the engaging arm 53 when the card C is ejected. An inclined guide surface 62a is formed on the first engaging part 62 to guide the rearward retraction of the engaging arm 53 when the locking of the first bar 50 is released. A guide 63 is disposed on the rear end of the main body 61. This guide 63 has a side edge 63a that is engaged by the locking part 55 of the engaging arm 53, which is caused to flex upward by the first tapered part 78 formed on the cover member 70 (described later), when the locking of the first bar 50 is released. The width of the guide 63 is greater than the width of the locking projection 29 of the frame 20 (see FIGS. 9(C) and 9(D)). Meanwhile, a second engaging part 64 is formed on the front end of the main body 61, protruding forward via an inclined part 61a that is inclined outward. The front end of the second engaging part 64 is formed as a bent part 65 that is bent outward. The bent part 65 engages with the engaging part 31 of the pivoting arm 30. Furthermore, a hole 66 in which the elastic part 79 of the cover member 70 is anchored is formed in the main body 61 near the second engaging part 64.

As is shown in FIGS. 7(A) to 7(D), the cover member 70 has a main body 71 that extends in the forward-rearward direction along the side wall 22 of the frame 20 so that this cover member 70 covers the first bar 50 and second bar 60. The cover member 70 may be formed, for example, by stamping and forming a metal plate. Guides 72 and 72' that regulate the movement of the main body 51 of the first bar 50 and the main body 61 of the second bar 60 in the vertical direction are respectively formed by being bent inward on the upper end and lower end of the main body 71. The first bar 50 and second bar 60 are supported (so that these bars can move in the forward-rearward direction) by the main body 71 and upper and lower guides 72 and 72', which surround the first bar 50 and the second bar 60. A flat-plate 73 is formed on the rear end of the main body 71, extending rearward via an inclined part 71a that is inclined outward. A plurality of anchors 74 that enter the spaces beneath the connecting parts 28 of the frame 20 are disposed on the upper end of the flat-plate 73 and on the guide 72 formed on the upper end of the main body 71. A plurality of anchors 75 that enter the spaces above the bent parts 26 of the frame 20 are disposed on the lower end of the flat-plate 73 and on the guide 72' formed on the lower end of the main body 71. The cover member 70 is attached to the frame 20 by the anchors 74 and 75. An engaging part 76, which engages the other hook of the tension spring 80 that forces the first bar 50 rearward, is formed by being bent outward on the upper end of the flat-plate 73. A second tapered part 77 is formed on the main body 71, to apply an inward driving force to the engaging arm 53 that is caused to flex outward by the tapered surface 29a of the locking projection 29 when the locking of the first bar 50 is released. As is shown in FIGS. 7(A) to 7(D), the second tapered part 77 is formed so that it is inclined at an inclination toward the rear from the main body 71. A first tapered part 78 is formed on the main body 71 to cause the engaging arm 53 to flex upward when the locking of the first bar 50 is released. Moreover, an elastic part (elastic locking member) 79 is formed on the main body 71 such that this elastic part 79 protrudes inward to prevent the forward advance of the second bar 60 when the locking of the first bar 50 is released. The elastic part 79 is anchored in the hole 66 of the second bar 60, and thus prevents the forward advance of the second bar 60 when the locking of the first bar 50 is released.

After the ejection mechanism 40 is attached to the frame 20 as shown in FIGS. 3(A) to 3(C), the card connector 1 is completed by attaching this assembly to the housing 10.

Figures 8A, 8B:
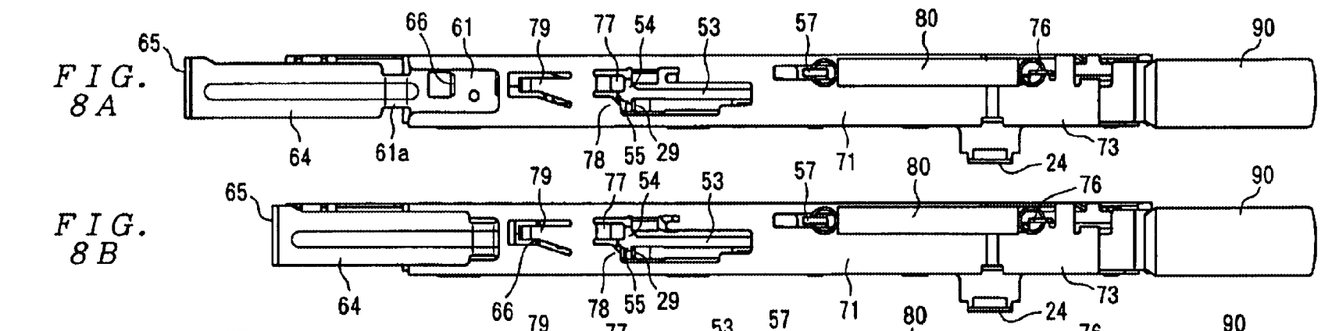
Figures 8C, 8D, 8E:
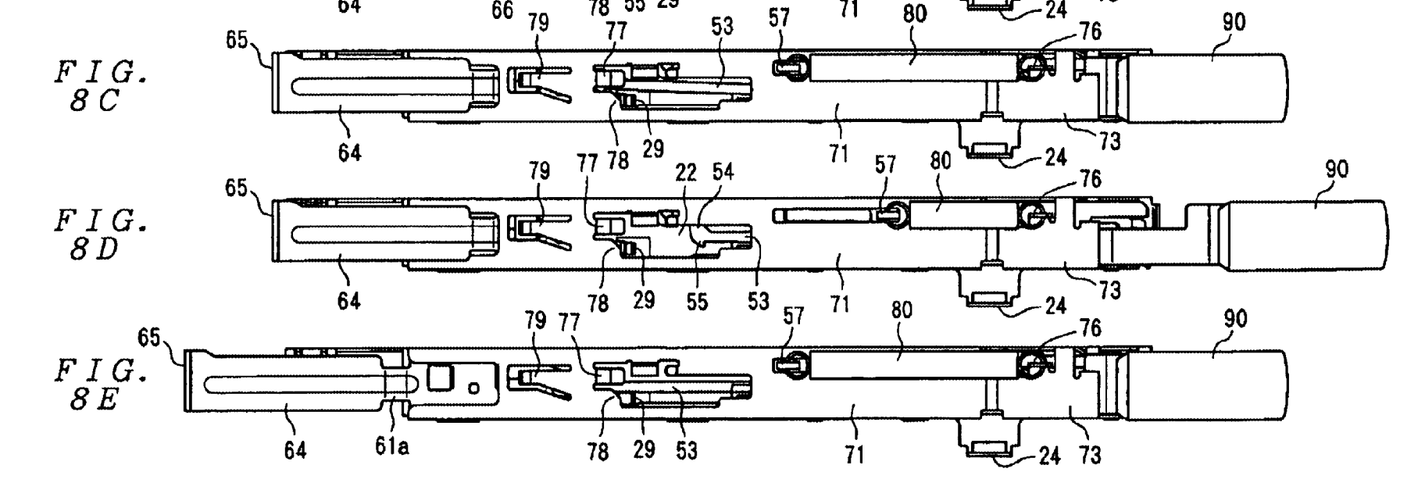
FIG. 8(C) shows a state during the release of the locking of the first bar.
FIG. 8(D) shows a state in which the locking of the first bar has been released, and the eject button is protruding in the ejection operating position.
FIG. 8(E) shows a state in which the card has been ejected.
Figure 9A:
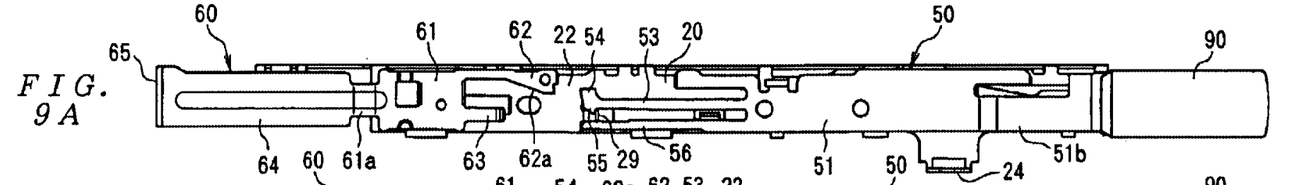
FIGS. 9(A) to 9(E) show the operation of the ejection mechanism, according to an embodiment of the present invention, with a cover member omitted, with FIG. 9(A) showing a state prior to the insertion of the card, FIG. 9(B) showing a state following the insertion of the card, FIG. 9(C) showing a state during the release of the locking of the first bar, FIG. 9(D) showing a state in which the locking of the first bar has been released, and the eject button is protruding in the ejection operating position, and FIG. 9(E) showing a state in which the card has been ejected.
Figure 9B:
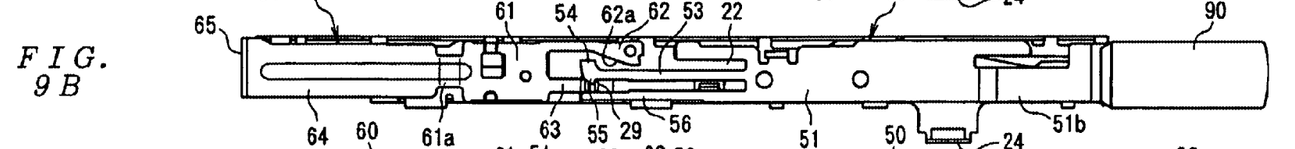
Figure 9C:
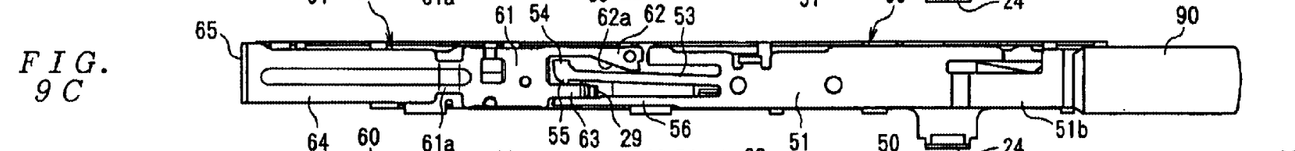
Figure 9D:
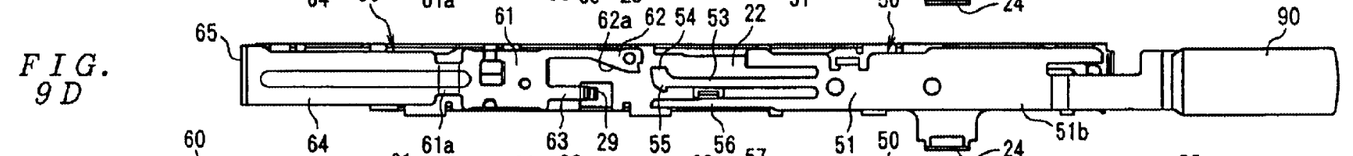
Figure 9E:
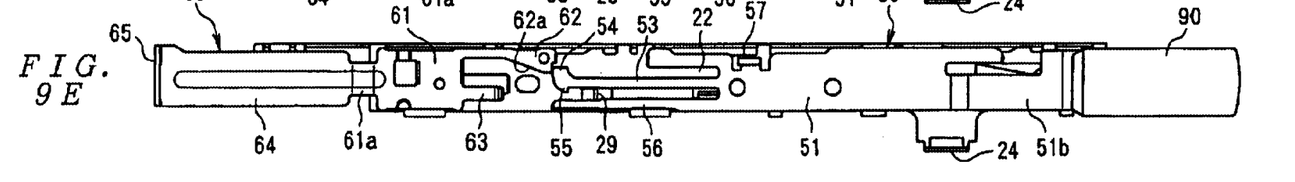
Figure 10A:
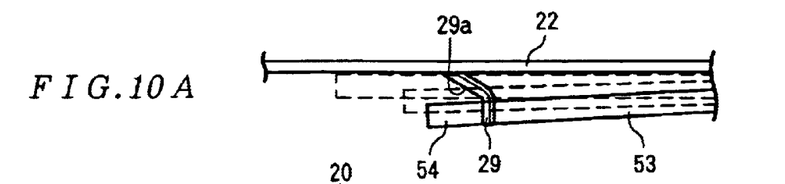
FIGS. 10(A) and 10(B) show the locking operation of a first bar of an exemplary card connector according to an embodiment of the present invention, with FIG. 10(A) showing a plan view, and FIG. 10(B) showing a left-side view.
Figure 10B:
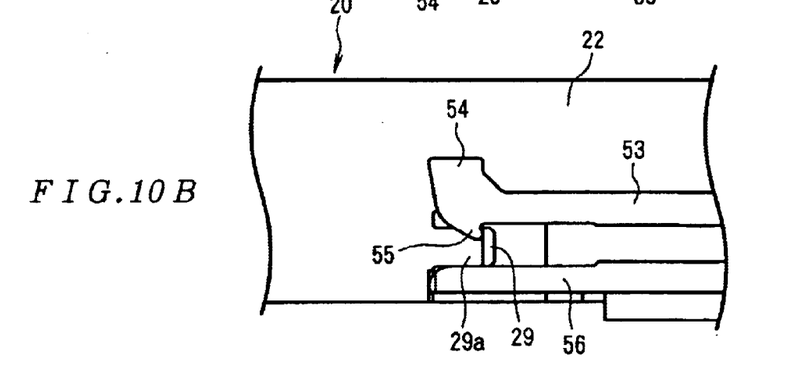
Figure 11A:
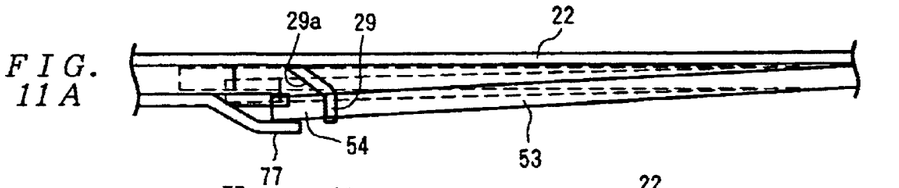
Figure 11B:
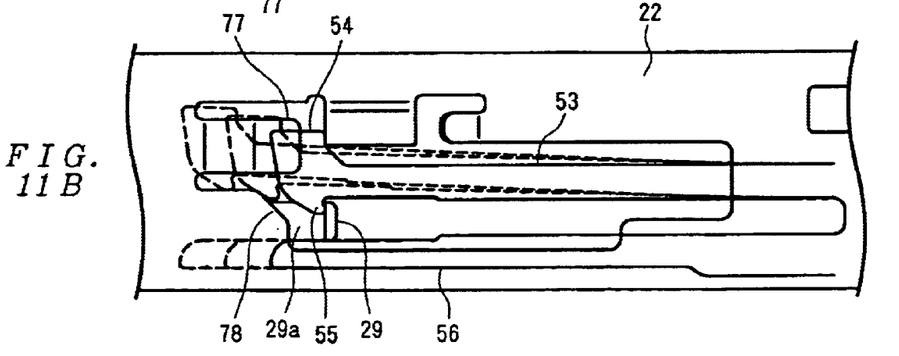
Figure 12:
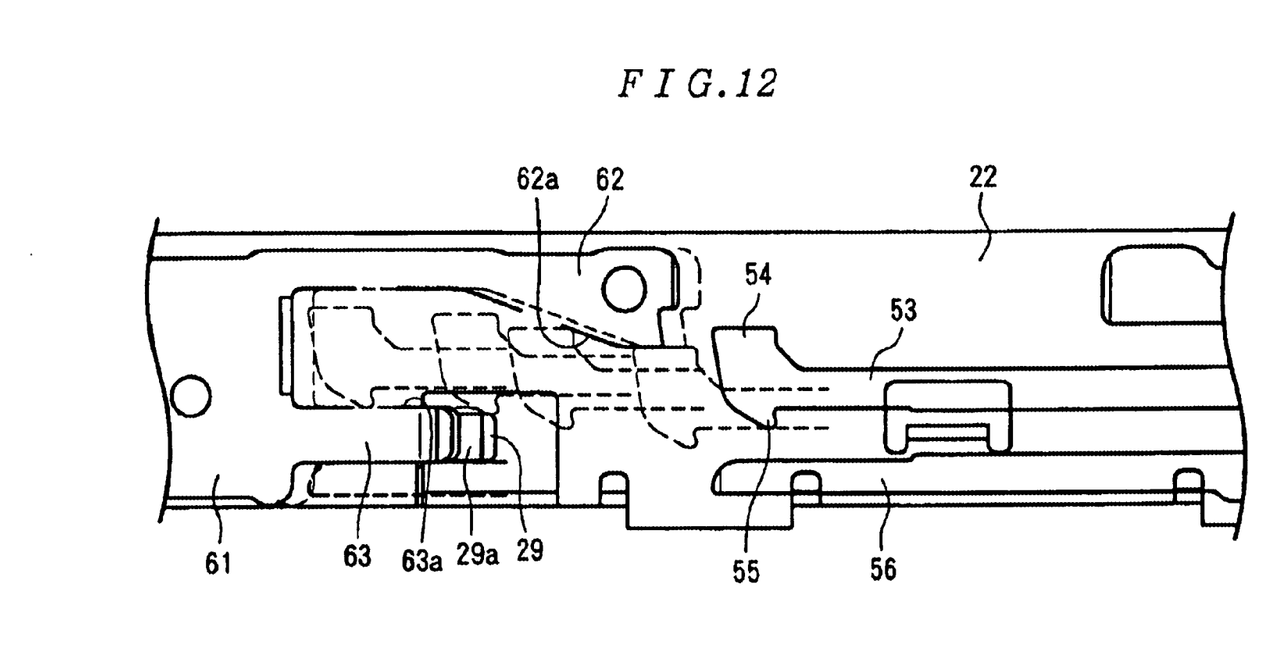
FIG. 12 is a left-side view showing the second stage of the release of the locking of the first bar according to an exemplary embodiment of the present invention.

Next, the operation of the present invention will be described with reference to FIGS. 8(A) to 8(E), 9(A) to 9(E), 10(A) and 10(B), 11(A) and (B), and 12. FIGS. 8(A) to 8(E) show the operation of the ejection mechanism in a state in which the cover member is attached, with FIG. 8(A) showing the state prior to the insertion of the card, FIG. 8(B) showing the state following the insertion of the card, FIG. 8(C) showing the state during the release of the locking of the first bar, FIG. 8(D) showing a state in which the locking of the first bar has been released, and the eject button is protruding in the ejection operating position, and FIG. 8(E) showing a state in which the card has been ejected. FIGS. 9(A) to 9(E) show the operation of the ejection mechanism in a state in which the cover member has been omitted, with FIG. 9(A) showing the state prior to the insertion of the card, FIG. 9(B) showing the state following the insertion of the card, FIG. 9(C) showing the state during the release of the locking of the first bar, FIG. 9(D) showing a state in which the locking of the first bar has been released, and the eject button is protruding in the ejection operating position, and FIG. 9(E) showing a state in which the card has been ejected. FIGS. 10(A) and 10(B) show the locking operation of the first bar, with FIG. 10(A) showing a plan view, and FIG. 10(B) showing a left-side view. FIGS. 11(A) and 11(B) show the first stage of the release of the locking of the first bar, with FIG. 11(A) showing a plan view, and FIG. 11(B) showing a left-side view. FIG. 12 is a left-side view showing the second stage of the release of the locking of the first bar.

As is shown in FIGS. 8(A) and 9(A), the second bar 60 is positioned in a forward position prior to the insertion of the card C. On the other hand, the first bar 50 is prevented from retracting rearward by the locking of the lock 55 on the locking projection 29 of the frame 20. When this first bar 50 is locked, the engaging arm 53 of the first bar 50 is caused to flex outward with respect to the side wall 22 of the frame 20 by the tapered surface 29a of the locking projection 29 as shown in FIGS. 10(A) and 10(B).

Then, when a card C is inserted while the first bar 50 is locked, the pivoting arm 30 pivots as a result of being pushed by the insertion of the card C, so that the second bar 60 is caused to retract rearward via the bent part 65 and second engaging part 64 as shown in FIGS. 8(B) and 9(B). When the first bar 50 remains locked, the engaging arm 53 of the first bar 50 is caused to flex outward with respect to the side wall 22 of the frame 20 by the tapered surface 29a of the locking projection 29. Accordingly, the passage of the first engaging part 62 of the second bar 60 between the frame side wall 22 and the engaging part 54 formed on the engaging arm 53 is allowed as shown in FIG. 9(B).

Then, when the card C is to be ejected, the eject button 90 of the first bar 50 is pressed so that the first bar 50 is caused to advance forward, thus releasing the locking of the first bar 50 as shown in FIGS. 8(C) and 9(C). When the locking of this first bar 50 is to be released, as is shown in FIGS. 11(A) and 11(B), the engaging arm 53 that was caused to flex outward by the tapered surface 29a of the locking projection 29 is driven inward by the second tapered part 77 of the cover member 70, and is caused to flex upward by the first tapered part 78. As is shown in FIG. 12, the lock 55 of the engaging arm 53 caused to flex upward by the first tapered part 78 engages with the side edge 63a of the guide 63 of the second bar 60, which is wider than the locking projection 29. Furthermore, the support 56 of the first bar 50 enters the space beneath the guide 63 and clamps the guide 63 of the second bar 60 together with the lock 55 formed on the engaging arm 53. When the locking of this first bar 50 is released, the elastic part 79 formed on the cover member 70 is anchored in the hole 66 of the second bar 60, thus preventing the forward advance of the second bar 60. If a state in which the card C is slightly removed from this position should be created for some reason following the insertion of the card C, there is a danger that the second bar 60 will advance forward when the eject button 90 is pressed. If the second bar 60 advances forward, the support 56 and lock 55 cannot clamp the guide 63, so that the guide 63 and locking projection 29 cannot be caused to approach each other. This means that the lock 55 will be locked on the locking projection 29, so that the eject button 90 does not reach the position shown in FIG. 9(D). However, this problem can be completely prevented by the anchoring of the elastic part 79 and hole 66.

Then, when the pressing operation of the first bar 50 is stopped, the first bar 50 is caused to retract rearward by the action of the tension spring 80 that forces the first bar 50 rearward as shown in FIGS. 8(D) and 9(D), and the lock 55 of the engaging arm 53 passes by the locking projection 29 while moving along the side edge 63a of the guide 63, so that the locking is released as shown in FIG. 12. In this case, the guide 63 that is clamped by the lock 55 of the engaging arm 53 and the support 56 retract rearward to the vicinity of the locking projection 29. At the same time, the engaging arm 53 retracts rearward while the engaging part 54 formed on the engaging arm 53 moves along the inclined guide surface 62a of the first engaging part 62, so that the locking is released. Furthermore, the eject button 90 disposed on the first bar 50 protrudes in the ejection operating position for the card C.

Then, when the protruding eject button 90 is pressed again, and caused to advance as shown in FIGS. 8(E) and 9(E), the engaging part 54 formed on the engaging arm 53 of the first bar 50 engages with the first engaging part 62 of the second bar 60, so that the second bar 60 advances forward. As a result, the pivoting arm 30 is caused to pivot via the second engaging part 64 and the bent part 65 of the second bar 60, so that the card C is ejected in the ejection direction.

Then, when the pressing operation of the first bar 50 is stopped, the first bar 50 is caused to retract rearward by the action of the tension spring 80, and returns to its original state shown in FIGS. 8(A) and 9(A); furthermore, the lock 55 of the engaging arm 53 is locked on the locking projection 29, so that further rearward retraction of the first bar 50 is prevented.

In cases where no card C is inserted into the connector, the second bar 60 is located in the forward position as shown in FIGS. 8(A) and 9(A). Accordingly, in this state, even if the eject button 90 of the first bar 50 is pressed and caused to advance, the locking of the first bar 50 cannot be released since the lock 55 of the engaging arm 53 does not engage with the side edge 63a of the guide 63 of the second bar 60.

As was described above, a card connector 1 can be constructed with an ejection mechanism 40 that allows a "push-push" operation, which is devised so that in cases where a card C has been inserted into the connector, or in cases where no card C has been inserted into the connector, the eject button 90 does not protrude into the ejection operating position, but is rather caused to protrude only when a card C that has been inserted into the connector is to be ejected (i.e., after a first push of the ejector button while the card C is in the connector).

Furthermore, this ejection mechanism 40 does not require a conventional swinging cam member such as that shown in FIGS. 16(A) and 16(B); accordingly, a connector can be constructed which is easy to manufacture and also easy to assemble.

Furthermore, a heart cam structure is not used in the ejection mechanism 40; accordingly, the width dimension of the ejection mechanism 40 can be reduced.

An embodiment of the present invention was described above. However, the present invention is not limited to this embodiment; various alterations or modifications may be made.

For example, the first bar 50, second bar 60 and cover member 70 may be made of a synthetic resin instead of metal.

As was described above, the card connector of the present invention can be constructed as a card connector with a push-push type ejection mechanism that allows a so-called push-push operation, in which the width dimension can be reduced since a heart cam structure is not used in the ejection mechanism, and in which there is no need for a swinging cam member.

We claim:

1. A card connector comprising:

a housing holding contacts therein;

a frame attached to the housing and configured to guide a card during insertion and removal of the card;

a pivoting arm pivotally disposed on the housing to eject the card in an ejection direction; and an ejection mechanism disposed on the side of the frame, and configured to pivot the pivoting arm when the card is to be ejected, wherein the ejection mechanism comprises a first bar which has a button support on one end and an engaging arm on the other end, a second bar which has a first engaging part on one end configured to engage with the engaging arm when the card is to be ejected and a second engaging part on the other end configured to engage with the pivoting arm, a cover member which supports the first bar and second bar so that these bars can move in the forward-rearward direction, and forcing means that force the first bar rearward; the first bar and second bar being aligned with one another along a side wall of the frame, a locking projection formed on the frame and configured to engage the engaging arm to prevent rearward retraction of the first bar, the locking projection having a tapered surface to cause the engaging arm to flex outward with respect to the frame when the first bar is locked, such that the passage of the first engaging part of the second bar is permitted, a tapered part formed on the cover member and configured to cause the engaging arm to flex upward when the locking of the first bar is released, and a guide disposed on the second bar having a side edge that is engaged by the engaging arm that is caused to flex upward by the tapered part when the locking of the first bar is released.

2. The card connector according to claim 1, wherein a second tapered part is formed on the cover member and configured to force inward movement of the engaging arm when the locking of the first bar is released.

3. The card connector according to claim 1, wherein a support is disposed on the first bar and configured to clamp the guide together with the engaging arm when the locking of the first bar is released.

4. The card connector according to claim 1, wherein an inclined guide surface is formed on the first engaging part of the second bar to guide the rearward retraction of the engaging arm when the locking of the first bar is released.

5. The card connector according to claim 1, further comprising an elastic locking member disposed on the cover member and configured to prevent the forward advance of the second bar when the locking of the first bar is released.

* * * * *